M. F. DOLAN.
COOKING UTENSIL.
APPLICATION FILED OCT. 1, 1909.
950,844.
Patented Mar. 1, 1910.
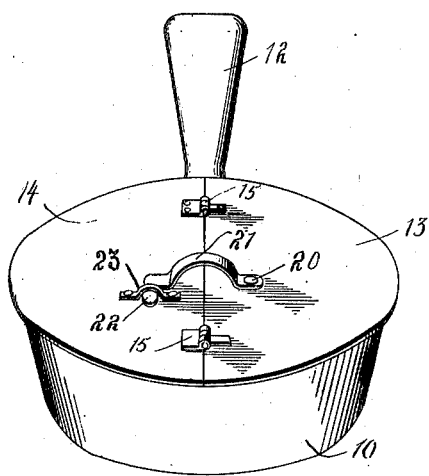
FIG. 1.
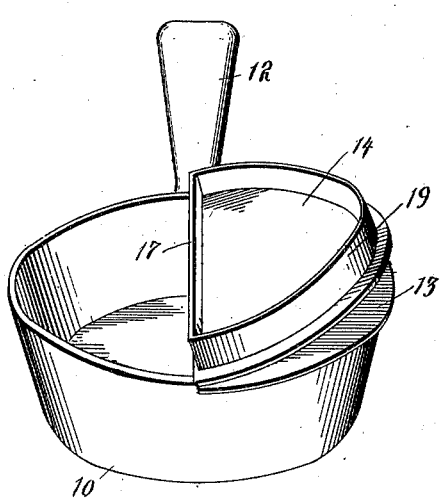
FIG. 2.
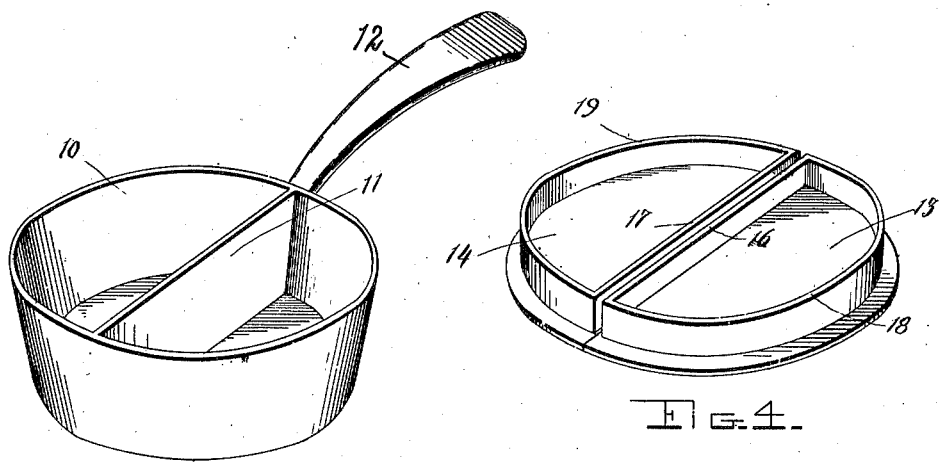
FIG. 3.   FIG. 4.
Witnesses
Inventor
Mattie F. Dolan
By 
Attorneys

UNITED STATES PATENT OFFICE.

MATTIE F. DOLAN, OF ABERDEEN, WASHINGTON.

COOKING UTENSIL.

950,844.

Specification of Letters Patent.

Patented Mar. 1, 1910.

Application filed October 1, 1909. Serial No. 520,437.

*To all whom it may concern:*

Be it known that I, MATTIE F. DOLAN, a citizen of the United States, residing at Aberdeen, in the county of Chehalis, State of Washington, have invented certain new and useful Improvements in Cooking Utensils; and I do hereby declare the following to be a full, clear, and exact description of the invention, such as will enable others skilled in the art to which it appertains to make and use the same.

This invention relates to cooking utensils, more particularly to the class of frying-pans and the like, and has for its object to provide a simply constructed device comprising two independent compartments for the food to be cooked and a double cover whereby access may be had to either of the compartments without disturbing the contents of the other compartment.

With this and other objects in view, the invention consists in certain novel features of construction as hereafter shown and described and then specifically pointed out in the claims, and in the drawings illustrative of the preferred embodiment of the invention, Figure 1 is a perspective view of the improved device with the cover located thereon and in closed position. Fig. 2 is a similar view with one portion of the cover in open position. Fig. 3 is a perspective view of the improved pan with the cover removed. Fig. 4 is a perspective view of the cover viewed from beneath.

The improved device comprises a body portion, represented as a whole at 10, and preferably in frying-pan form, and provided with a central division member 11 and a handle 12, the handle preferably extending in the same longitudinal plane as the division member 11. By this means the vessel is divided into two independent compartments of substantially the same size.

Bearing upon the upper open side of the member 10 is a cover structure formed of two leaves or portions 13—14, hingedly united at 15, each portion forming a closure to one of the compartments of the vessel 10.

Connected to the underface of the portion 13 of the cover is a holding strip 16 which is designed to bear at one side of the division member 11, while a similar strip 17 is connected to the closure member 14 and bears against the opposite side of the member 11.

Depending from the cover member 13 near its outer rim is a semi-circular flange 18, while a similar flange 19 depends from the closure member 14, the flanges bearing inside of the rim of the member 10 and assisting in maintaining the cover in position, and also forming strips to prevent the escape of the fumes and also to prevent the fumes from one compartment from passing into that of the other. By this means different articles of food may be cooked at the same time without interference one with the other, and articles of food which require different lengths of time may be disposed in the different compartments and removed therefrom without interference with the other compartment. Thus fish which takes longer to cook than some kinds of meat may remain for any desired period of time in its compartment, or several articles may be cooked in one compartment during the same period of time that one article of food is being cooked in the other compartment.

The improved device will be found of great advantage in " short-order " restaurants, and may be employed upon coal or gas ranges with equal facility.

Mounted to swing at one end at 20 to the cover member 13 is a handle 21 having its free end formed with a lateral offset 22, and connected to the cover member 21 is a keeper 23 beneath which the offset 22 engages when the handle is disposed in one position. By this means the handle is utilized to form a lock device between the members 13—14 and maintain them rigidly in open position as shown in Fig. 1. When the handle and the closure are arranged as shown in Fig. 1, it will be obvious that the closure may be lifted bodily from the vessel 10 in the same manner as an ordinary one-piece cover; but, when access is desired to either one of the two compartments of the vessel 10, the handle 21 is turned upon its pivot 20 until the offset 22 is free from the keeper 23 when the handle may be turned into the position shown in Fig. 2, thus releasing the cover members so that either may be turned upwardly without uncovering the other compartment. Thus the contents of either compartment is accessible without disturbing or exposing the contents of the other compartment.

The vessel 10 may be formed of any suitable material, and of any required size, and it is not desired therefore to limit the improved device to any specific size or to any particular material from which it may be constructed. The cover members 13—14 may also be formed from any suitable material and of a size to correspond to the member 10 in connection with which it is to be employed.

What is claimed is:—

1. A cooking utensil comprising a hollow body having a partition dividing it into compartments, a closure formed of portions corresponding to the compartments and hingedly united, a combined lock and handle swinging at one end from one of said cover portions, and a keeper carried by the other cover portion and adapted to receive one end of the handle.

2. A cooking utensil comprising a hollow body having a partition dividing it into compartments, a closure formed of portions corresponding to the compartments and hingedly united, flanges depending from the cover portions and engaging within the compartments of the body, a combined lock and handle swinging at one end from one of said cover portions, and a keeper carried by the other cover portion and adapted to receive one end of the handle.

In testimony whereof, I affix my signature, in presence of two witnesses.

MATTIE F. DOLAN.

Witnesses:
GUY MARTEN,
ALLEY ROAP.